J. J. IRVINE.
MANHOLE BRIDGE.
APPLICATION FILED AUG. 10, 1916.

1,255,424.

Patented Feb. 5, 1918.

WITNESSES
L. Hauerstein
J. E. Larsen

INVENTOR
John J. Irvine
BY Munn & Co
ATTORNEYS

UNITED STATES PATENT OFFICE.

JOHN J. IRVINE, OF PITTSBURGH, PENNSYLVANIA.

MANHOLE-BRIDGE.

1,255,424.     Specification of Letters Patent.     Patented Feb. 5, 1918.

Application filed August 10, 1916. Serial No. 114,143.

*To all whom it may concern:*

Be it known that I, JOHN J. IRVINE, a citizen of the United States, and a resident of Pittsburgh, in the county of Allegheny and State of Pennsylvania, have invented certain new and useful Improvements in Manhole-Bridges, of which the following is a specification.

My invention relates to newly packed man or hand holes in boilers and the like, and the main object thereof is to provide means for automatically maintaining a steam-tight joint at said man or hand holes during the shrinking of the gaskets while the boiler is being started and until the gaskets have reached their limit of compression.

With the bridge now employed for the covers it is necessary to closely watch new packings when the boiler is being placed in use and to take up on the nuts at frequent intervals to prevent leakage or, possibly, blow-outs, this being rendered unnecessary by my invention.

My invention is fully described in the following specification, of which the accompanying drawings form a part, in which like characters refer to like parts in each of the views, and in which:—

Figure 1:
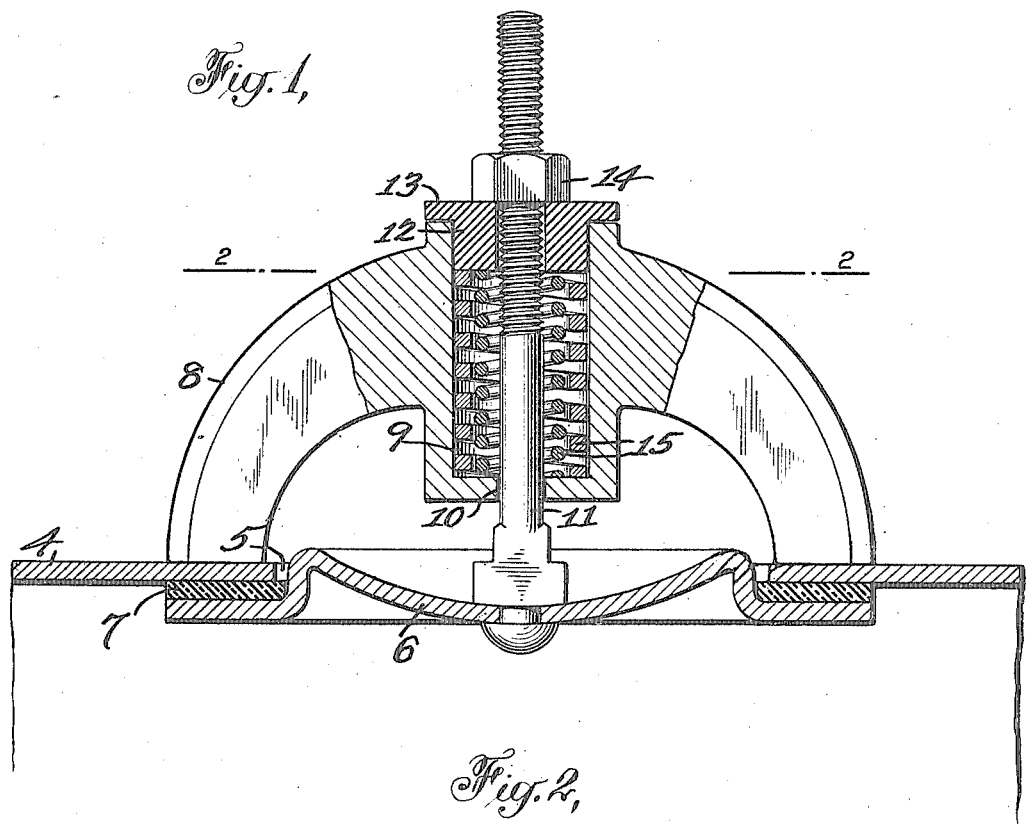
Figure 1 is a fragmentary section taken through a man or hand hole of a boiler and showing my invention in operative position, partly in section to show details.
Figure 2:
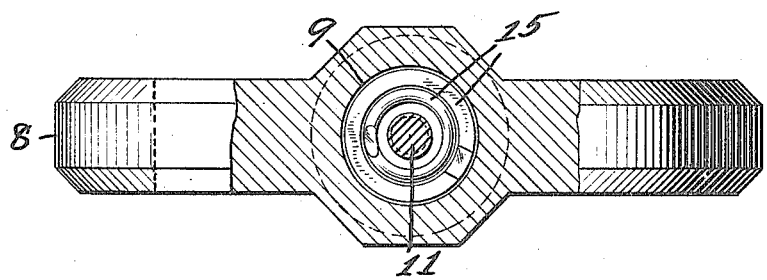
Fig. 2 is a section taken on the line 2—2 of Fig. 1.
Figure 3:
Fig. 3 is a detached view of a flanged washer which I employ.

Referring to the drawings, 4 represents a fragment of a boiler having a man or hand hole 5 therein covered by means of a plate or cover 6 and between which and said boiler packing gaskets 7 are employed and which, when new, shrink under pressure and permit the escape of steam unless the pressure is frequently increased.

To prevent this frequent attention, I provide a yoke or bridge 8 spanning the hole 5 and provided with a cylindrical recess 9 and a reduced bore 10 at the bottom thereof, a bolt 11 being secured to the cover plate 6 and passed upwardly through the bridge 8 and through a washer 12 closely fitting the recess 9 and provided with a flange 13 at its outer end, a nut 14 being provided on the screw threaded end of said bolt.

Within the recess 9 are springs 15, although but one may be used if desired, tending to force the washer 12 outwardly of the recess against the nut 14 and thus forcing the cover plate firmly against the gasket 7 regardless of the shrinking of the latter under this pressure and the degree of such pressure is controlled by the nut 14.

I have found that, in the use of my device, during an interval after the nut 14 has been set up to firmly seat the flange 13 on the outer end of the bridge, the gasket had shrunk to an extent allowing the flange 13 to move away from the bridge a considerable distance, though the cover plate continued to maintain a steam-tight joint because of the springs 15 and, in such event, the nut may be again set up to again cause the flange 13 to bear upon the bridge.

My device may be permanently installed on a boiler, or it may be used only during the shrinking process of the gasket and a conventional yoke substituted therefor when the boiler is not in use but, in view of the low cost of the device, their permanent use at man and hand holes will avoid this substitution of other yokes therefor.

My invention is very simple in construction, installation, and use, is highly efficient and well adapted to the purpose for which it is designed, and prevents leakage from a boiler whereby persons near might be scalded.

While I have shown a preferred embodiment of the invention, I do not desire to limit myself thereto but may make changes thereover, provided such changes do not depart from the spirit of the invention and come within the scope of the appended claims.

Having fully described my invention, what I claim as new, and desire to secure by Letters Patent, is:—

As an article of manufacture, for use with the man-hole cover of a boiler, a yoke having a recess therein and a bore at the bottom of said recess, a bolt passed upwardly through said bore and recess and beyond said yoke and adapted to be secured to a man-hole cover, a washer fitting snugly in the said recess and having a flange resting upon the yoke, said washer closing the open end of said recess and through which extends said bolt, a nut on said bolt and bearing on said washer, and a spring within said recess and engaging the washer and the bottom of the recess, said spring tending to force said washer outwardly of said recess.

JOHN J. IRVINE.

Copies of this patent may be obtained for five cents each, by addressing the "Commissioner of Patents, Washington, D. C."